US012743487B1

(12) United States Patent
Geng et al.

(10) Patent No.: US 12,743,487 B1
(45) Date of Patent: Sep. 22, 2026

(54) COMPUTER PROCESSES FOR CLUSTERING PROPERTIES INTO NEIGHBORHOODS AND GENERATING NEIGHBORHOOD-SPECIFIC MODELS

(71) Applicant: CoreLogic Solutions, LLC, Irvine, CA (US)

(72) Inventors: Wei Geng, San Diego, CA (US); Duncan Chen, Pacific Palisades, CA (US); Bin He, Philadelphia, PA (US); Jon Wierks, Irvine, CA (US); David Stiff, Cambridge, MA (US); Howard Botts, Santa Monica, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 350 days.

(21) Appl. No.: 18/054,703

(22) Filed: Nov. 11, 2022

Related U.S. Application Data

(63) Continuation of application No. 16/812,087, filed on Mar. 6, 2020, now Pat. No. 11,501,100.

(60) Provisional application No. 62/815,882, filed on Mar. 8, 2019.

(51) Int. Cl.

| | |
|---|---|
| ***G06F 18/23*** | (2023.01) |
| ***G06F 18/213*** | (2023.01) |
| ***G06F 18/22*** | (2023.01) |
| ***G06F 18/25*** | (2023.01) |
| ***G06N 20/00*** | (2019.01) |
| ***G06Q 50/16*** | (2024.01) |
| ***G06Q 50/163*** | (2024.01) |

(52) U.S. Cl.
CPC ............ *G06F 18/23* (2023.01); *G06F 18/213* (2023.01); *G06F 18/22* (2023.01); *G06F 18/251* (2023.01); *G06N 20/00* (2019.01); *G06Q 50/16* (2013.01); *G06Q 50/163* (2013.01)

(58) Field of Classification Search
CPC ........ G06F 18/23; G06F 18/22; G06F 18/251; G06F 18/213; G06N 20/00; G06Q 50/16; G06Q 50/163
USPC .......................................................... 707/737
See application file for complete search history.

(56) References Cited

U.S. PATENT DOCUMENTS 5,361,201 A * 11/1994 Jost ........................ G06Q 40/02 705/35
8,655,106 B2 * 2/2014 Den Herder ....... G06Q 30/0206 382/286
10,380,653 B1 8/2019 Flint et al.
11,501,100 B1 11/2022 Geng et al.
(Continued)

*Primary Examiner* — Mohammad Ali
(74) *Attorney, Agent, or Firm* — Knobbe Martens Olson & Bear, LLP

(57) ABSTRACT

A computer system and associated processes are disclosed for grouping similar real estate properties into contiguous neighborhoods, and for generating neighborhood-specific models capable of estimating property values within their respective neighborhoods. A clustering component uses various sources of property-level data to group properties based on measures of property similarity. For example, the clustering component may measure property similarity based on how frequently specific properties are designated as comparable in appraisal reports. A model generator uses a machine learning process to determine, for specific neighborhoods, correlations between property attributes and values, and uses these correlations to generate the neighborhood specific models.

21 Claims, 5 Drawing Sheets

(56) References Cited

U.S. PATENT DOCUMENTS

| | | | | |
|---|---|---|---|---|
| 2008/0288312 | A1* | 11/2008 | Miles | G06Q 30/0205 705/7.34 |
| 2013/0103595 | A1* | 4/2013 | Berry | G06Q 30/0283 705/306 |
| 2014/0164260 | A1 | 6/2014 | Spieckerman | |
| 2015/0112874 | A1 | 4/2015 | Serio et al. | |
| 2016/0048934 | A1* | 2/2016 | Gross | G06V 10/40 705/313 |
| 2016/0292800 | A1* | 10/2016 | Smith | G06Q 50/16 |
| 2018/0373734 | A1* | 12/2018 | Sargent | G06F 16/29 |
| 2020/0012667 | A1* | 1/2020 | Hill | G06Q 40/10 |

* cited by examiner

| Neighborhood creation method | Train coverage % | Test coverage % |
|---|---|---|
| Affinity Propagation and Occurrences | 91.59 | 91.06 |
| Affinity Propagation, Laplacian, cosine similarity | 92.85 | 92.48 |
| Affinity Propagation, Laplacian, Euclidean distance | 92.81 | 92.46 |
| Affinity Propagation, FastText, cosine similarity | 92.85 | 92.48 |
| Spectral Clustering | 92.81 | 92.46 |
| ZIP Code | 99.98 | 100 |
| Census Tract | 65.03 | 57.51 |

Fig. 3

COMPUTER PROCESSES FOR CLUSTERING PROPERTIES INTO NEIGHBORHOODS AND GENERATING NEIGHBORHOOD-SPECIFIC MODELS

PRIORITY CLAIM

This application is a continuation of U.S. application Ser. No. 16/812,087, filed Mar. 6, 2020, which claims the benefit of U.S. Provisional Appl. No. 62/815,882, filed Mar. 8, 2019. The disclosures of the aforesaid applications are hereby incorporated herein by reference.

BACKGROUND

Technical Field

The present invention relates to algorithms and computer processes for grouping properties into neighborhoods.

Description of the Related Art

For various purposes it desirable to group real estate properties into neighborhoods. For example, home price prediction algorithms, such as those implemented by automated valuation models (AVMs), commonly rely on the neighborhood of a home to predict the value of the home.

Several methods are currently used in the industry to define neighborhoods. These methods include the following: (a) grouping properties based on U.S. Census Blocks (public information created by US Census), (b) using Real Estate data or Realtor to define a commonly known neighborhoods, (c) using a group of local residents to define neighborhoods in their city, (d) using a zip codes, and dividing each zip code roughly in half, and (e) using documented "neighborhoods" defined by the City Controller. Unfortunately, these approaches often produce very inconsistent results, and results in which properties of widely ranging characteristics are assigned to the same neighborhood.

BRIEF DESCRIPTION OF THE DRAWINGS

FIG. 3 illustrates a comparison of neighborhood creation methods in terms of training coverage and test coverage.

DETAILED DESCRIPTION OF THE PREFERRED EMBODIMENTS

The present invention comprises a computer system and associated processes that use property-level data, such as MLS data, appraisal data, and mortgage records, to cluster or group "similar" properties into contiguous neighborhoods. As one example, the system may use the comparable properties identified in recent appraisal reports as one indication of properties that should be grouped into the same neighborhood (as described below). The system may assign a unique neighborhood ID to each cluster, and maintain a mapping that maps specific properties to their respective neighborhood IDs.

In some embodiments, the system also generates, for at least some of the neighborhoods, respective AVMs for estimating the values of properties in such neighborhoods. Each such AVM uses the information about the properties included in the respective neighborhood to make more accurate predictions of property values. The system may update the AVMs substantially in real time as new information becomes available about the properties included in the neighborhood.

Figure 1:
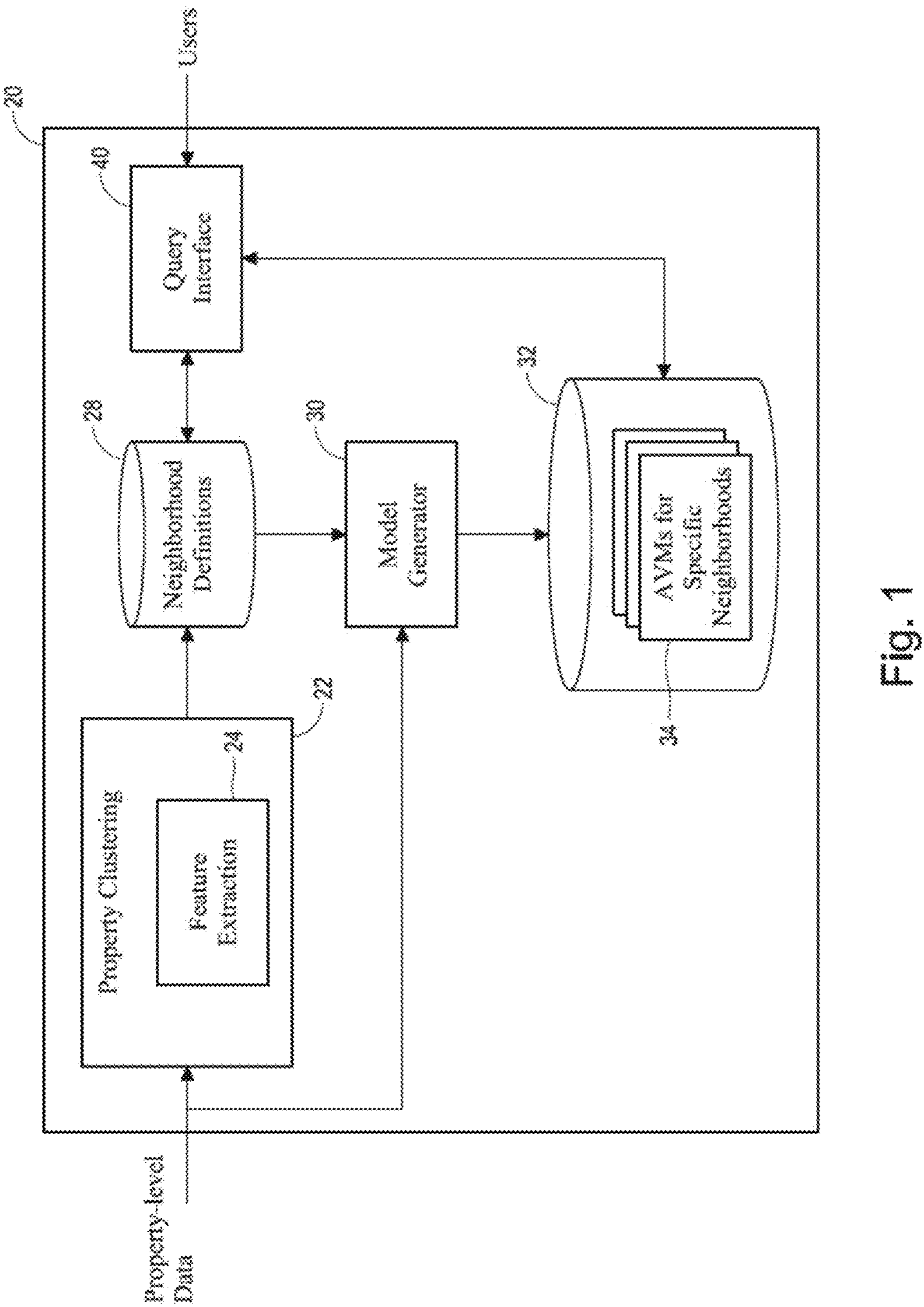
FIG. 1 illustrates a system for clustering properties into neighborhoods according to one embodiment.

FIG. 1 illustrates one embodiment of the system 20. The system includes a property clustering component 22 that receives property-level data from one or more data sources (and preferably multiple data sources), and uses this data to form property clusters that represent respective neighborhoods. The property-level data may include, for example, any one or more of the following MLS (Multiple Listing Service) data, appraisal data (e.g., appraisal reports), mortgage records, House Parcel data, and county assessor and recorder data (as aggregated and maintained, for example, by CoreLogic). The clustering component may also consider homeowner demographic data when such data is available. The system also assigns a unique neighborhood ID to each cluster.

As shown in FIG. 1, the property clustering component may include a feature extraction component 24 that determines features or characteristics of properties by analyzing the property-level data. As one example, the feature extraction component 24 may include an image analysis component that analyzes property images (e.g., as obtained from MLS records, appraisal reports, etc.) to identify the characteristics and conditions of houses. Various algorithms for detecting property characteristics and conditions from image data are known in the art and may be used for this purpose. As another example, the feature extraction component may use known text analysis algorithms to extract, from MLS listings, keywords and phrases descriptive of property characteristics and conditions.

The clustering component 22 preferably uses these extracted features, among others (such as property locations, sale prices, zip codes, etc.), to group together similar properties into neighborhoods. The clustering process may be constrained such that a contiguous boundary can be drawn around each neighborhood on a map, with each property falling within that boundary being assigned to the corresponding neighborhood. In other words, each neighborhood is preferably defined as a contiguous geographic area. Any of a variety of known clustering algorithms may be used, such as a k-means algorithm, Spectral Clustering, a hierarchical clustering algorithm, a biclustering algorithm, a self-organized map algorithm, a disjoined aggregation algorithm, or a combination thereof.

As is known in the art of clustering algorithms, different amounts of weight may be given to different property features or attributes for purposes of calculating degrees of similarity between the properties. For example, property location and listing price may be given more weight than, for example, property zip code or property condition. The weights may be selected to emphasize property attributes strongly correlated with property values, such that the neighborhood definitions are especially useful for predicting property values. In some embodiments, the clustering component gives significant weight to "comparable properties" data obtained from recent appraisal reports (e.g., appraisal reports issued in the last 3 years), such that properties identified as comparable by an appraiser will have a strong tendency to be grouped into a common neighborhood. As shown in FIG. 1, the results of the clustering process are stored in a "neighborhood definitions" database 28. This database maps specific properties (by property address, parcel number, and/or other property identifier) to specific neighborhood IDs. The neighborhood definitions database 28 may also store other neighborhood data, such as boundary definitions (e.g., in terms of GPS coordinates), average home price, average house size, etc.

Optionally, the clustering component 22 can group together similar properties into neighborhoods by implementing some or all of the operations performed by a geocoding engine of the type described in U.S. patent application Ser. No. 14/713,663, entitled "SYSTEM AND METHOD FOR LINKING DATA RECORDS FOR PARCELS" and filed on May 15, 2015, which is hereby incorporated by reference herein in its entirety. For example, the clustering component 22 can use multiple data sources, optionally including the extracted features described above, to convert physical addresses or locations into precise geographic coordinates to identify similar properties and/or properties that fall within a contiguous boundary.

As further shown in FIG. 1, the system 20 also preferably includes a model generator 30 that generates neighborhood-specific AVMs for some or all of the defined neighborhoods. As is known in the art, the model generator 30 may use a machine learning process, such as a neural network, a support vector machine, a Bayesian network, or a Decision Tree algorithm, to determine correlations between property attributes and property values in the respective neighborhood. Each neighborhood-specific AVM may be based primarily or exclusively on the property data of the properties within the respective neighborhood. As a result, the neighborhood-specific AVMs tend to be more accurate at estimating property values than conventional AVMs. As is known in the art of machine learning and computer models, each AVM preferably includes a set of weights that specify amounts of weight to give to particular property attributes in calculating an estimated property value. In some embodiments 30, the model generator updates the neighborhood-specific AVMs substantially in real time (e.g., on an hourly or daily basis) as new data becomes available on properties within the respective neighborhoods.

As further shown in FIG. 1, the system may also include a query interface 20 that enables users of the system to retrieve information about specific properties and/or neighborhoods. For example, in one embodiment a user, via the query interface, can enter and submit a property address (or other property identifier), and the system responds by returning some or all of the following: (1) the unique neighborhood ID of the corresponding neighborhood, (2) a map showing the boundary of the neighborhood, (3) data regarding characteristics of the neighborhood, and (4) the estimated value of the property, as calculated using the AVM for the respective property. The system may also generate an interactive map that enables the user to interactively explore the property value estimates (as calculated with the neighborhood-specific AVM) of other properties in the neighborhood.

The system 20, including its illustrated components 22-40, may be implemented by a computer system programmed with executable program modules stored on one or more computer-readable media (hard disk drives, solid state memory devices, etc.). The system's components may be distributed or replicated across multiple physical servers or other computing devices of the computer system, which may or may not be co-located. Each such server typically includes one or more hardware processors that execute program instructions, a solid state memory, a network interface, and various other hardware components. The computer system may, in some embodiments, be a cloud computing system. The functionality of the components of the system 20 may be distributed among software components differently than shown in FIG. 1, and some components and functions may be omitted in some embodiments. The data repositories 28, 32 shown in FIG. 1 may include databases, flat file systems, and/or other types of data storage systems, and may use hard disk drives, solid state memories, and/or other types of non-transitory computer storage devices.

Use of Appraisal Data

One source of data that is highly useful for auto-defining neighborhoods is appraisal data obtained from property appraisal reports. A typical appraisal report includes information about comparables. The comparables selected by the appraiser are not necessarily the most similar properties to the subject property. The appraiser typically selects comparables by selecting similar transactions which took place recently and are in the same market as the subject property. By analyzing a sufficient number of appraisals, the system can learn where the market is bounded, even though the system may not know what factors define the market (such as school district, local attraction, highway access, micro weather, scenic views, etc.).

The "market" the appraiser operates within is not equivalent to the neighborhoods defined by the system. This is largely because appraisers follow a practice of not selecting comparables further than 3 miles from the subject property. When not enough comparables can be selected, the appraisers tend to extend the search to older transactions as opposed to selecting more distant properties. To account for this common appraiser behavior, the clustering component 22 may exclude from consideration "outlier" comparables that are based on relatively old transactions, such as transactions more than 3 years before the date of the appraisal report.

The process of determining whether to connect (local) markets into a neighborhood is referred to herein as "aggregation." When subject and comparable properties are geocoded, they become points on a map with no area. But because we can safely assume adjacent properties are likely located in the same neighborhoods, we extend the point to a tile, which has area. We call this tile a unit of aggregation. Examples of units of aggregation are a hexagon grid system, census tract, census block, and builder defined division. Once a unit of aggregation is selected, relationships between property pairs can be calculated using various measurements of similarity or "distance." Once property similarity/distance values are calculated, one or more clustering algorithms are used to perform aggregation.

Subject-comp pairs in appraisal reports can be treated as explicit expert endorsements of two properties' similarity. Given this, we can use these appraisals as input to data-based algorithms that seek to model and group properties based off their similarity. In one embodiment, the clustering component uses subject-comp occurrences as simple counts connecting our units of aggregation. Alternatively, more complex representations of the connections can be used using graph Spectral Clustering, which is a known connectivity-based clustering method. Regardless of the particular clustering algorithm used, the algorithm preferably treats the count of how many times two properties have been designated as comparable in appraisal reports as a measure of the similarity or relationship between these properties. The clustering algorithm may optionally give more weight to more recent appraisal reports, such as by applying an age-based decay factor during the counting process.

The primary unit of aggregation that we have explored is Uber's Hexagonal Hierarchical Spatial Index. Hexagons are equidistant from each of their neighbors as opposed to square or triangular grids, helping with spatial analysis and grouping. The hexagonal grid system also produces regular, non-subjective base units unlike human defined polygons. These basic units of aggregation can form the building blocks of our neighborhoods. Geographic units of aggregation are more easily defined, stable, and readily available than individual property boundaries making them preferable for use when defining neighborhoods.

Two primary categories of features affect a property's value: location attributes and physical attributes. If a region represents a neighborhood well, we will expect a good price model to depend on the physical attributes. On the contrary, if a region includes multiple neighborhoods, we will not expect a high accuracy price model to be built upon the physical characteristics only. Thus, the system evaluates a region as a candidate neighborhood by determining how well price correlates with physical attributes.

Connecting/Aggregating Neighbor Blocks Based on Appraisal Reports

In some embodiments of the system, the concept of using appraisal reports to measure the similarity between properties is extended to "neighbor blocks." The following are examples of neighbor blocks (also referred to herein simply as "blocks"): (1) a multi-residence building structure or development, such as an apartment building, a condo building, or a gated community; (2) a census block or tract, or (3) a builder's subdivision. Any one or more types of neighbor blocks may used by the property clustering component 22. As described below, a neighbor block may also be formed by merging two neighbor blocks that neighbor each other.

For example, if a condo in a condo development (one type of neighbor block) is designated as a comparable to another condo in another condo development, a link may be created between these two condo developments; this link increases the likelihood that the clustering algorithm will group these two condo developments together into a common neighborhood.

Figure 4:
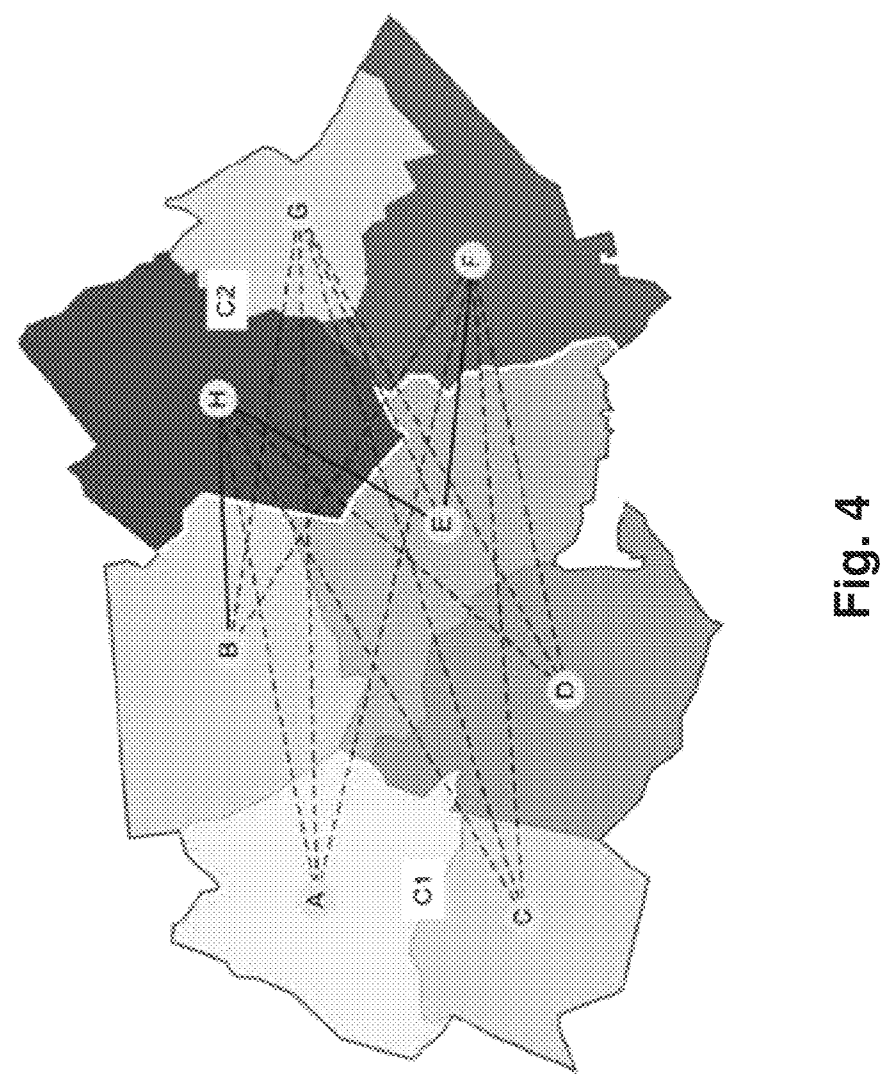
FIG. 4 illustrates appraisal report based links created between building blocks.
Figure 5:
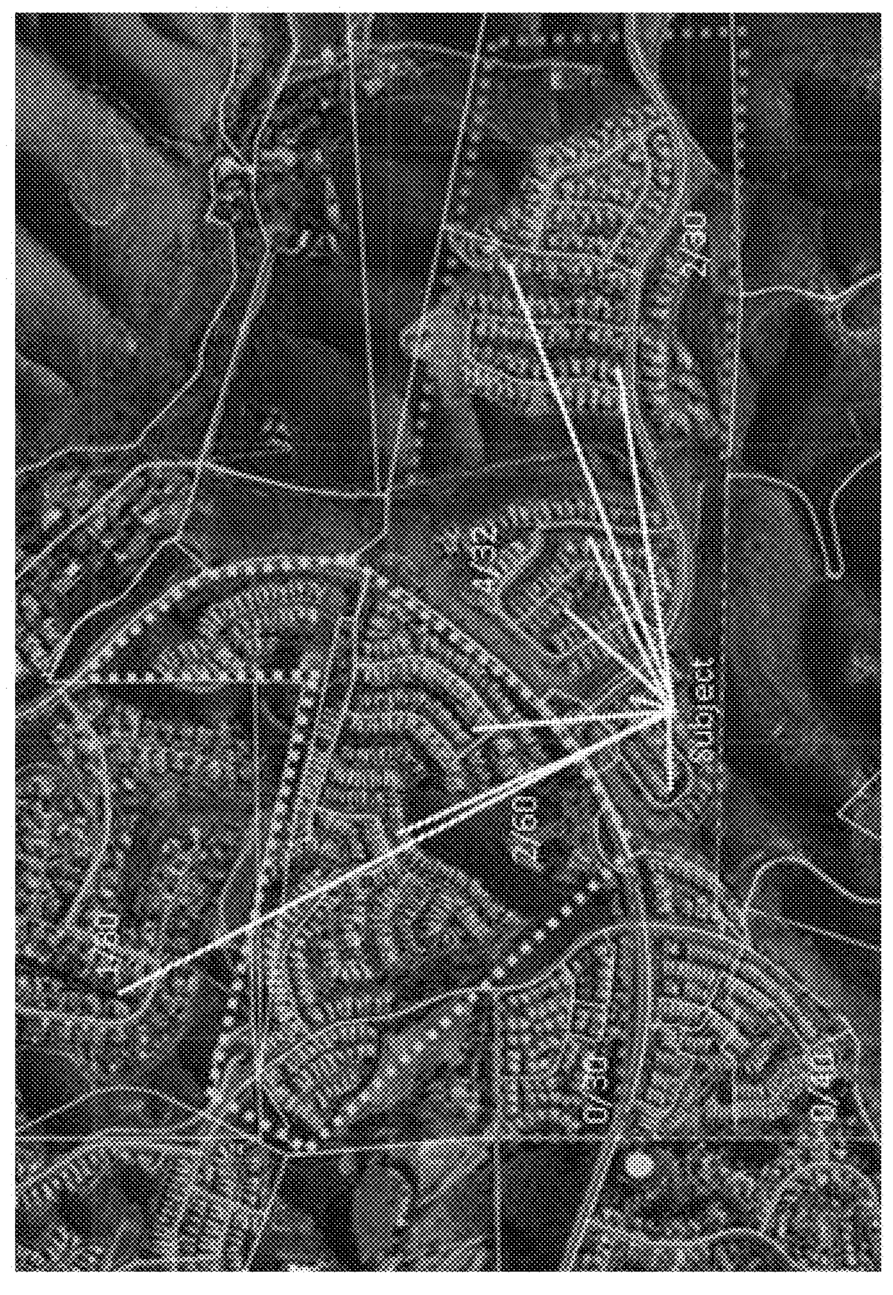
FIG. 5 illustrates appraisal report based links created between residential developments.

The following is one example of an algorithm that may be used by the property clustering component 22 to connect and aggregate neighbor blocks and form neighborhoods based on appraisal reports:

(1) For each comparable property pair in each appraisal report, connect (form a link between) the two neighbor blocks in which the two properties reside. This may be repeated for each of multiple types of neighbor blocks. FIGS. 4 and 5 show examples of links formed between neighbor blocks based on appraisal reports. More specifically, FIG. 4 shows links between building blocks, and FIG. 5 shows links between blocks that correspond to residential developments.

(2) Aggregate/combine the links between each pair of connected blocks, and generate a normalized score representing a degree of connectivity or similarity between the two blocks. This results in a connectivity matrix. Normalization removes the effects of block size (number of properties) may be performed by, for example, dividing the number of linkages over the total number of properties in the blocks.

(3) Apply a clustering algorithm to the connectivity matrix to identify neighboring blocks. Examples of clustering algorithms include, but are not limited to, Regionalization, Edge-Ratio Network, Maximal Entropy, and Graph Theory. Two blocks are neighbors if there are no properties between them. A clustering algorithm can, for example, use geospatial operations to determine whether two blocks are neighbors by growing/expanding each block's geographic boundary; if they touch each other without touching other blocks first, these blocks may be deemed neighbors. The clustering algorithm may group blocks based solely on the strengths of the linkages between them (as represented, e.g., by the normalized scores), or may also consider any one or more other the other similarity factors/metrics described herein (e.g., similarity based on features extracted from property images, etc.).

(4) Merge neighboring blocks to create a new block, and form new linkages and a new connectivity matrix using the newly formed block(s).

(5) Repeat steps (3) and (4) iteratively until stopping criteria is met. The stopping criteria seeks to stop the process at a point at which neighborhoods are optimally formed. The stopping criteria may be based on information entropy, modularity, and/or other factors. As one example, a stopping criterion based on information entropy may compare the strength of the linkages within a block (which may have been formed from a block merge) to the strengths of the linkages between that block and other blocks. If the internal linkage strength is higher, the neighbor block may be considered optimal in size, and may be treated/defined as a neighborhood.

Generation of Neighborhood-Specific Price Models

Two price models that can be used to estimate property values are linear regression and XGBoost. Linear regression is a de-facto model and is widely used due to its simplicity. XGBoost is an open-source software library that provides a gradient boosting framework for various programming languages. XGBoost is a newer than linear regression, and can incorporate various additional data. Other types of gradient boosting algorithms and software packages can be used in place of XGBoost.

The system preferably uses real transaction data and the above price models to predict prices. The metrics we calculate for these price predictions are: Percent Predicted Error with 10% (PPE10), for which higher values are better, and Median Absolute Percentage Error (MAPE), for which lower values are better.

In one embodiment, the clustering component 22 runs linear and XGBoost models for each neighborhood and measures their accuracy, allowing the system to objectively assess their quality.

Evaluation and Model Results

Figure 2:
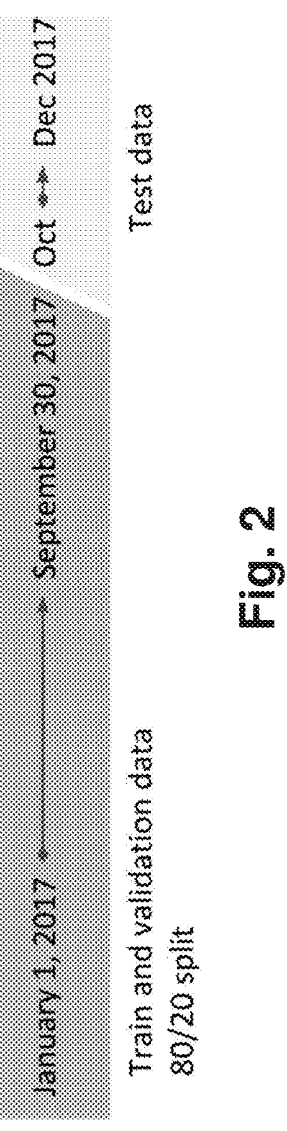
FIG. 2 illustrates an example division of transaction data into training data, validation data, and test data.

For this study, we have chosen Los Angeles, Orange, and San Diego counties in California as well as Shelby county in Tennessee to evaluate a variety of locations. As for the historical transactions, we chose 1 year of data from four counties to evaluate our neighborhoods. 2017 was the most recent year with complete data so it was selected. This data was divided into training, validation and test data. The first 9 months of the year were used as training and validation data with an 80/20% random split. The final 3 months of the year were held out as test data to model current/future predictions. This is illustrated by FIG. 2.

The first evaluation metric we consider is coverage. We will use the numbers from Orange County to guide our discussion as seen in Table 1. Traditional ZIP codes provide complete geographic coverage but our evaluation models require a minimum amount of data to train. Additionally, linear models cannot model transactions with missing characteristics so their data coverage numbers are lower as a result. A transaction is considered "covered" if it is contained in a neighborhood and there are enough transactions to build a model for that neighborhood.

ZIP code data coverage:

XGBoost models 99.98% training data coverage

100% test data coverage

Linear models 85.12% training data coverage 77.41% test data coverage

To be viable, our neighborhoods should also provide reasonably high coverage. As seen from FIG. 3, XGBoost models on Orange County covered over 91% of the training across our methods and Table 1 shows our linear regression provided coverage with 5% of the ZIP codes.

There are two causes for the lower coverage numbers for our method. The first is that when there are insufficient historical appraisals for a tile our method does not group it into a neighborhood. This is desirable because it excludes non-residential tiles from the neighborhoods. The results in less than 100% geographic coverage so some percent of the evaluation data will not fall into a neighborhood. The second cause is the same as we saw with ZIP codes: some of the neighborhoods have insufficient evaluate data to train a model. These combine to give the coverage numbers seen in FIG. 3.

The next metrics to explore are the model fidelity metrics. We are already seeing positive results that improve over the baseline ZIP code groupings. As seen in Table 1, our neighborhoods are showing 5% improvement in PPE10 on both the validation and test data when compared to ZIP codes as well as a 1% improvement in MAPE. The PPE10 improvements are particularly exciting because this is a key measure of accuracy in the property valuation domain and shows that our neighborhoods already provide a significant advantage.

TABLE 1

| Method | Train Coverage | Test Coverage | PPE10 Train | PPE10 Valid | PPE10 Test | MAPE Train | MAPE Valid | MAPE Test |
|---|---|---|---|---|---|---|---|---|
| Affinity propagation and occurrence-XGBoost | 91.59 | 91.06 | 84.7% | 56.4% | 49.6% | 2.7% | 8.3% | 10.1% |
| Linear regression | 80.83 | 72.82 | 56.5% | 53.6% | 50.8% | 8.3% | 9.1% | 9.8% |
| ZIP-XGBoost | 99.98 | 100 | 62.8% | 51.1% | 47.7% | 6.9% | 9.7% | 11.8% |
| Linear regression | 85.12 | 77.41 | 48.9% | 46.8% | 46.4% | 10.3% | 11.0% | 10.9% |

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A computing system comprising one or more hardware processors to execute program code stored in computer memory, the one or more hardware processors programmed to implement the program code to execute a process that comprises:

determining a plurality of blocks within a geographic region, each block comprising a plurality of residential properties;

forming links between pairs of the blocks based on measures of similarity between particular residential properties in the blocks;

aggregating the links to generate a normalized score for each pair of the blocks representing a degree of similarity between the blocks;

applying a clustering algorithm to the blocks to form neighborhoods, said clustering algorithm constrained such that each neighborhood has a contiguous boundary, wherein the clustering algorithm merges neighboring blocks based at least partly on numbers of said links formed between the blocks and the normalized scores;

assigning a unique identifier to each neighborhood; and generating, for a neighborhood identified by the unique identifier and formed by application of the clustering algorithm, a neighborhood-specific model configured to estimate values of properties in the neighborhood.

2. The computing system of claim 1, wherein forming links between pairs of the blocks comprises forming a link between a first block and a second block based at least partly on a residential property in the first block being designated in an appraisal report as comparable to a residential property in the second block.

3. The computing system of claim 2, wherein the first block is a first multi-residence development and the second block is a second multi-residence development.

4. The computing system of claim 1, wherein at least some of the blocks are census tracks.

5. The computing system of claim 1, wherein applying the clustering algorithm comprises:

generating, for each of a plurality of pairs of neighboring blocks, a normalized score representing a degree of connectivity or similarity between the neighboring blocks of the respective pair, said normalized score eliminating an effect of block size; and determining whether to merge particular neighboring blocks based at least partly on the normalized scores.

6. The computing system of claim 1, wherein the process comprises applying the clustering algorithm iteratively until a stopping criterion is met.

7. The computing system of claim 6, wherein applying the clustering algorithm iteratively comprises merging a first block with a second block to form a third block based at least partly on a number of links between the first and second blocks, and thereafter merging the third block with a fourth block based at least partly on a number of links between the third and fourth blocks.

8. The computing system of claim 6, wherein the stopping criterion comprises a comparison of strengths of linkages within a given block to strengths of linkages between the given block and other blocks.

9. The computing system of claim 1, wherein the clustering algorithm determines whether a first block and a second block are neighbors by expanding geographic boundaries of the first and second blocks while determining whether the first and second blocks touch each other without first touching any other blocks.

10. The computing system of claim 1, wherein the process further comprises generating, for a neighborhood formed by application of the clustering algorithm, a neighborhood-specific model configured to estimate values of properties in the neighborhood.

11. The computing system of claim 10, wherein generating the neighborhood-specific model comprises using a machine learning process to determine, for the neighborhood, correlations between property attributes and property values in the neighborhood, and generating weight values specifying amounts of weight to give to specific property attributes in estimating property values in the neighborhood.

12. A computing system comprising one or more computing devices programmed with executable program code stored in computer memory, the computing system programmed to implement a process that comprises:

calculating measures of similarity between real estate properties, said measures of similarity based at least partly on designations in appraisal reports of particular real estate properties as comparable; and forming links between pairs of the real estate properties based on the measures of similarity;

aggregating the links to generate a normalized score between each pair of real estate properties representing a degree of similarity between the real estate properties;

grouping the real estate properties into neighborhoods based on the normalized scores such that each neighborhood has a contiguous geographic boundary, wherein grouping the real estate properties into neighborhoods comprises executing a clustering algorithm; and generating, for each neighborhood formed by application of the clustering algorithm, a neighborhood-specific model configured to estimate values of properties in the neighborhood.

13. The computing system of claim 12, wherein the process comprises generating, for a property pair composed of a first real estate property and a second real estate property, an occurrence count value representing a number of times the first and second real estate properties have been designated as comparable to each other in the appraisal reports, and using said occurrence count value as a factor for measuring property similarity of the first and second real estate properties.

14. The computing system of claim 12, wherein the process comprises measuring similarity between first and second neighbor blocks, each of which comprises a plurality of real estate properties, based at least in part on a number of times a real estate property in the first block is designated in an appraisal report as comparable to a real estate property in the second block.

15. The computing system of claim 14, wherein measuring said similarity comprises generating a normalized score that eliminates an effect of block size.

16. The computing system of claim 15, wherein the clustering algorithm is configured to use the normalized score to determine whether to merge the first and second blocks.

17. The computing system of claim 12, wherein the process further comprises generating, for a neighborhood formed by application of the clustering algorithm, a neighborhood-specific model configured to estimate values of properties in the neighborhood.

18. The computing system of claim 17, wherein generating the neighborhood-specific model comprises using a machine learning process to determine, for the neighborhood, correlations between property attributes and property values in the neighborhood, and generating weight values specifying amounts of weight to give to specific property attributes in estimating property values in the neighborhood.

19. A computing system comprising one or more computing devices programmed with executable program code stored in computer memory, the computing system programmed to implement a process that comprises:

determining a plurality of blocks within a geographic area, each block comprising a plurality of residential properties;

determining a neighborhood that comprises a subset of the blocks, said neighborhood having a contiguous geographic boundary, wherein determining the neighborhood comprises:

forming links between pairs of the blocks based on measures of similarity between residential properties;

aggregating the links to generate a normalized score for each pair of the blocks representing a degree of similarity between the blocks;

merging neighboring blocks of said plurality of blocks based on the normalized scores; and determining correlations between property attributes and property values of residential properties in the neighborhood based on a neighborhood-specific model, wherein determining said correlations comprises executing the neighborhood-specific model that learns said correlations.

20. The computing system of claim 19, further comprising generating, based on said correlations, weight values specifying amounts of weight to give to specific property attributes in estimating property values of residential properties in the neighborhood.

21. The computing system of claim 19, wherein merging neighboring blocks comprises:

for a first block and second block that are neighboring, generating a normalized score representing a degree to which residential properties in the first block are similar to residential properties in the second block; and using the normalized score to determine whether to merge the first block with the second block.

* * * * *